Dec. 15, 1931. T. E. HERLIHY Re. 18,288

SEPARABLE CONNECTER

Original Filed Nov. 20, 1928

INVENTOR.
THEODORE E. HERLIHY
BY John A. Wilson
ATTORNEY.

Reissued Dec. 15, 1931 Re. 18,288

UNITED STATES PATENT OFFICE

THEODORE E. HERLIHY, OF LOS ANGELES, CALIFORNIA, ASSIGNOR, BY DIRECT AND MESNE ASSIGNMENTS, TO THE LUBRICATION CORPORATION, OF SOUTH BEND, INDIANA, A CORPORATION OF DELAWARE

SEPARABLE CONNECTER

Original No. 1,779,737, dated October 28, 1930, Serial No. 320,651, filed November 20, 1928. Application for reissue filed May 28, 1931. Serial No. 540,786.

My invention relates to and has for its primary object the provision of a separable connecter embodying a pair of members capable of being connected and disconnected with the utmost ease and dispatch, and which when connected, will be securely held against accidental separation.

It is a further object of my invention to provide a separable connecter particularly adapted, although not necessarily, for use in lubricating systems of motor vehicles and other forms of machinery, the separable connecter embodying a pair of fluid conducting members, one of which is adapted to be permanently attached to a flexible hose or other conduit leading from a source of lubricant under pressure, and the other to an instrumentality to be lubricated, the members being capable of connection and disconnection with the utmost ease, and when connected, providing a conduit for the passage of lubricant, with the joint between the members sealed under the action of the pressure of the lubricant so as to prevent leakage of lubricant at the joint.

I will describe only one form of separable connecter embodying my invention, and will then point out the novel features thereof in claims.

In the accompanying drawings.

Figure 1:
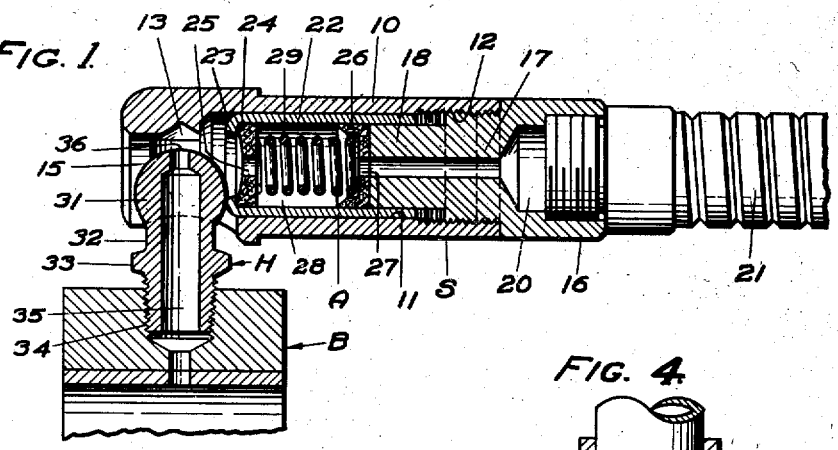
Fig. 1 is a longitudinal central sectional view of one form of separable connecter embodying my invention, and illustrating one of the positions capable of being occupied by the members of the connecter relatively to each other during the operation of connecting the members.
Figure 4:
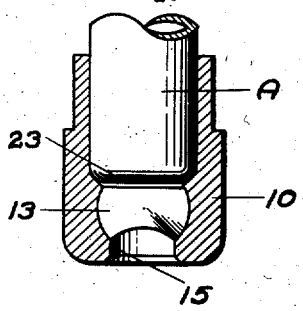
Fig. 4 is a fragmentary detail sectional view of one of the members of the connecter, taken on the line 4—4 of Fig. 2 and looking in the direction of the arrows.

Referring specifically to the drawings in which similar reference characters designate similar parts in each of the several views, my invention in its present embodiment comprises a socket member S, a head member H, insertable into the socket member, and a means designated generally at A for detachably connecting the members in such manner that the members can be connected or disconnected with the utmost ease and dispatch. The members are preferably constructed in a manner to provide fluid conduits therethrough, adapted to communicate with each other when the members are connected; and the members as illustrated are particularly adapted for use in lubricating systems for lubricating parts of motor vehicles and other mechanisms. In this use of my invention the socket member S is adapted to be secured to a hose or other conduit leading from a source of lubricant under pressure while the head member H is adapted to be secured to a part of a mechanism in a manner to communicate with a duct leading to a bearing or other instrumentality to be lubricated. The socket member is capable of being applied to and removed from the head member at will and when connected to the latter, the means A above referred to functions to prevent accidental disconnection of the members as well as to insure a fluid-tight joint between the two and thus prevent leakage of lubricant at the joint.

The socket member S comprises a body 10 of metal having a longitudinally extending cylindrical bore 11 threaded at one end of the body as indicated at 12, and communicating at its other end with a socket 13 having a head receiving opening 14 and a shank receiving opening 15, the openings communicating with each other and being disposed respectively at a side and at an end of the body. A cap 16 is provided with an externally threaded portion 17 threaded into the threaded end 12 of the bore 11 so as to close the respective end of the body, and is provided with a reduced cylindrical extension 18 projecting into the bore 11. Through the cap 16 extends an axial duct 19 terminating at one end at the free end of the extension and at its other end communicating with a pocket 20 internally threaded to permit connection of the socket member S to a flexible nose 21 or other conduit leading from a source of lubricant supply under pressure. The body or member generally designated 10 in fact constitutes a hollow outer tube, conduit or sleeve and may be referred to by any such appellation in the claims; however no specific limitation upon any claim is desired or intended to be imposed by the use of any one term, since the terms are used in a substantially synonymous manner.

The means A above referred to comprises in the present instance a plunger 22 slidably mounted in the bore 11 and being in the form of an open ended cylinder, into one end of which projects the extension 18 of the cap 16. The other end of the plunger is provided with an inwardly projecting flange 23 against which abuts a flat washer 24 having an axially disposed outlet port 25. Within the plunger is a second and cup-shaped washer 26 having an axial inlet port 27. The interior of the plunger between the washers 24 and 26 broadly constitutes a pressure chamber 28 communicating with the inlet port 27 and outlet port 25 of the respective washers; and interposed between the washers is a coiled expansible spring 29 which broadly constitutes a means for normally urging the plunger to one extreme position and against a shoulder 30 formed in the body 10 at the junction between its bore 11 and socket 13. The extension 18 broadly constitutes a fixed abutment for the spring, against which the washer 26 is forced by the spring. The plunger or member generally designated 22, in fact constitutes a hollow inner tube, conduit or sleeve and may be referred to by any such appellation in the claims; however as with respect to the member 10, no specific limitation upon any claim is desired or intended to be imposed by the use of any one such term, since the terms are used in a substantially synonymous manner.

Figure 2:
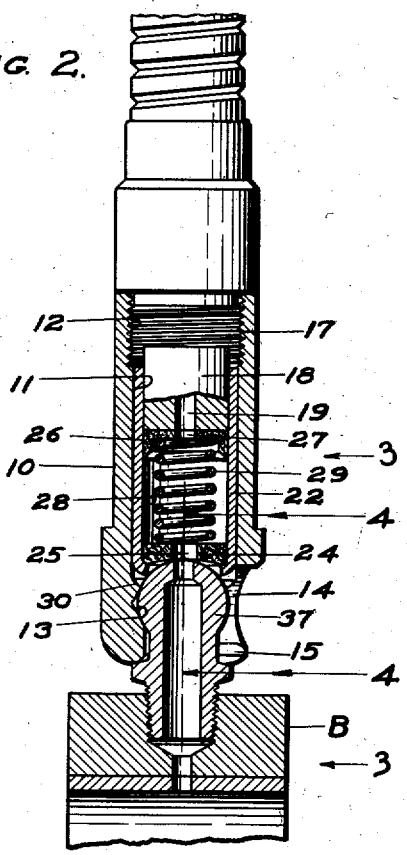
Fig. 2 is a view similar to Fig. 1 and illustrating the members fully connected for the passage of lubricant from one member to the other.
Figure 3:
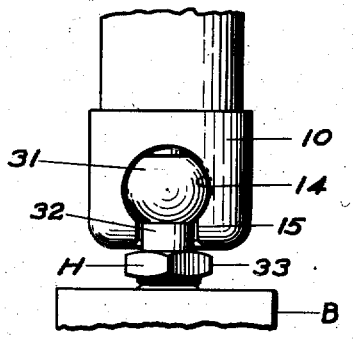
Fig. 3 is a fragmentary view in elevation looking at Fig. 2 in the direction of the arrows 3—3.

The head member H in the present instance is constructed to provide a spherical head 31 from which extends a shank 32 having a wrench receiving flange 33 and an externally threaded extremity 34 by means of which the head member is adapted to be screwed into a suitably threaded duct leading to a bearing or other instrumentality to be lubricated, the head member being hollow to provide a fluid conduit 35 therethrough terminating at one end in an inlet port 36 adapted to register with the outlet port 25 of the washer 24 when the head occupies the position in the socket 13 shown in Fig. 2.

The operation of the separable connecter is as follows:

Let it be assumed that the head member H is secured to a bearing B as illustrated in Figs. 1 and 2, and that the socket member S is secured to the hose 21 to which lubricant under pressure is supplied, it being understood that the flow of lubricant through the hose is controlled by a suitable valve (not shown).

The operation of applying the socket member S to the head member H to connect the two for the passage of lubricant through the connecter is accomplished either by initially applying the socket member to the head 31 to seat the latter in the socket 13 with the socket member projecting laterally from the head member as shown in Fig. 1, and then swinging the socket member bodily through an arc of 90 degrees to the position shown in Fig. 2, so that the shank 32 of the head member is disposed in the shank receiving opening 15 and the outlet and inlet ports 25 and 36 register, or by applying the socket member directly to the head member from the side of the latter in the parallel position of the head member relative to the socket member shown in Fig. 2. The provision of these two ways of applying the socket member to the head member is a decided advantage in conditions where the head member is accessible only from certain directions and but minimum space is available in which to manipulate the socket member.

It will be noted that in the extreme position of the plunger 22 in which it abuts the shoulder 30, the plunger projects a slight distance into the socket 13, so that in inserting the head 31 into the socket, the plunger is forced rearwardly by the head away from the shoulder 30, and it will thus be clear that under the urging action of the spring 29, the plunger will be maintained in engagement with the head and will force the latter against the wall of the socket 13 on opposite sides of the shank receiving opening 15, so that the head will be frictionally maintained against accidental displacement from the socket.

With the head and socket members connected and occupying the relative positions shown in Fig. 2, it will be clear that lubricant under pressure from the hose 21 will pass through the duct 19, inlet port 27, pressure chamber 28, outlet port 25, inlet port 36 and thence through the conduit 35 into the bearing. The lubricant in the pressure chamber 28 will, under its expansive action, force the washer 26 tightly against the abutment formed by the extension 18 and expand the washer snugly against the inner peripheral wall of the plunger so as to seal the joint between the latter and washer against the escape of lubricant, and will also function to exert pressure upon the inner face of the washer 24 to tend to force the plunger forwardly and thereby force the washer 24 into fluid sealing engagement with the head 31. The head 31 will thus be firmly clamped in the socket 13 and the joint between the plunger and head tightly sealed against the leakage of lubricant, and it will be clear that the greater the pressure of lubricant in the chamber 28, the more tightly will the joint between the plunger and head be sealed against leakage, and the more firmly will the head be clamped in the socket. When the flow of lubricant is discontinued from the hose 21 and the pressure in the chamber 28 thereby relieved, the spring 29 will, under its urging action, maintain the head and socket members connected, yet will permit the members to be readily disconnected when desired.

Although the separable connecter embodying my invention has been described for use in lubricating systems, it will be readily apparent that it is capable of use in many forms of conduits conducting fluids under pressure to provide a detachable connection with a joint sealed against leakage of fluid. Furthermore, my separable connecter could also be employed in ignition systems of automobiles to provide a detachable current conducting connection between the spark plugs of the vehicle's motor and the conductors for supplying current to the plugs. In this latter use of my invention, the lubricant conduits through the members could, of course, be dispensed with and reliance placed solely on the spring 29 to maintain the members connected.

Although I have herein shown and described only one form of my invention, it is to be understood that various changes and modifications may be made therein without departing from the spirit of the invention and the spirit and scope of the appended claims.

I claim:

1. A separable connecter comprising a member including a body having a longitudinal bore and a socket communicating with one end of the bore, a cap closing the other end of the bore and having a reduced extension projecting axially into the bore, the cap having an axial duct therethrough, a tubular plunger slidably mounted in the bore and into one end of which said extension projects, a washer constituting a seal closing the other end of the plunger and provided with an outlet port, a second and cup shaped washer in the plunger adapted to abut the extension and having a port adapted to register with the duct in the cap, a spring in the plunger interposed between the washers for urging the plunger to one extreme position, and a head member insertable into said socket and constructed to provide a fluid conduit having an inlet port adapted to register with the outlet port of the first mentioned washer.

2. A separable connecter as defined in claim 1 wherein said socket is provided with communicating head and shank receiving openings disposed respectively at a side of and at an end of the body, and said head member includes a spherical head and a shank, whereby to permit the head to be inserted into the head receiving opening from the side of the body and the head member swung through a predetermined angle to a position wherein its shank is disposed in the shank receiving opening and its inlet port registers with the outlet port of the first mentioned washer.

3. A separable connecter comprising a member including a body having a longitudinal bore and a socket communicating with one end of the bore, a cap closing the other end of the bore and having a reduced extension projecting axially into the bore, the cap having an axial duct therethrough, a tubular plunger slidably mounted in the bore and into one end of which said extension projects, a washer constituting a seal closing the other end of the plunger and provided with an outlet port, a second and cup shaped washer in the plunger adapted to abut the extension and having a port adapted to register with the duct in the cap, and a spring in the plunger interposed between the washers for urging the plunger to one extreme position.

4. A separable connecter comprising a member including a body having a longitudinal bore and a socket communicating with one end of the bore, a cap closing the other end of the bore and having a reduced extension projecting axially into the bore, the cap having an axial duct therethrough, a tubular plunger slidably mounted in the bore and into one end of which said extension projects, means for sealing the other end of the plunger, said means being provided with an outlet port, a cup shaped washer in the plunger adapted to abut the extension and having a port adapted to register with the duct in the cap, and a spring in the plunger interposed between the washer and the sealing means for urging the plunger to one extreme position.

5. A separable connecter comprising a member including a body having a longitudinal bore and a socket communicating with one end of the bore, a cap closing the other end of the bore and having a reduced extension projecting axially into the bore, the cap having an axial duct therethrough, a tubular plunger slidably mounted in the bore and into one end of which said extension projects, means for sealing the other end of the plunger, said means being provided with an outlet port, means for sealing the portion of the plunger within which said extension projects from other portions of the plunger, said last named means having a port adapted to register with the duct in the cap, and resilient means positioned in the plunger between the two said sealing means for urging the plunger to one extreme position.

6. A lubricating coupler comprising a sleeve having a ball receiving socket formed within and adjacent one end and an opening through a side wall adjacent said end for reception of a spherical head of fitting therethrough, said end of the sleeve beyond said socket being provided with a slot communicating with said opening, said slot having a width less than the diameter of the spherical head of a fitting received in said socket, a second sleeve mounted in the first said sleeve for sliding movements toward and from said socket, means normally urging said second sleeve toward said socket, and means at the socket end of the second said sleeve for making sealing engagement with the spherical head of a fitting in said socket and for clamping said head within said socket.

7. A coupler and lubricant nozzle for a ball-head lubrication fitting of the character described comprising outer and inner telescoping and relatively slidable sleeves, one of said sleeves being adapted at one end for connection with a grease supply means, a ball receiving socket formed in the end of the outer sleeve at the end thereof remote from said grease supply connection, said inner sleeve at its end remote from said supply connection being adapted to secure the ball-head between it and said remote end of the outer sleeve and in said socket, and means normally resiliently urging said remote ends of said sleeves toward one another.

8. A coupler and lubricant nozzle for a ball-head lubrication fitting having a lubricant receiving duct through the ball-head comprising, an outer sleeve having a head at one end and a ball receiving socket within said head in communication with a slot extending transversely of the axis of the sleeve, said head also having an opening through a side wall into said socket for passage of the ball-head of a fitting into said socket, said slot being of less width than the diameter of the ball-head of a fitting, an inner sleeve slidably mounted within the outer sleeve and having one end movable into said ball receiving socket, and means operated by lubricant under pressure for urging said ends of said sleeves relatively toward one another for securing the ball-head of a fitting in said socket.

9. A coupler and lubricant nozzle for a ball-head lubrication fitting having a neck and a lubricant receiving duct through the head and neck comprising a sleeve having one end formed to provide an internal socket thereat for the reception of the ball-head of a fitting throughout a wide angular range, said sleeve having an opening through a side wall into said socket for passage of the ball-head therethrough into the socket, said sleeve end having a slot extending partially thereacross transversely thereof and communicating with said socket and opening, said slot being of less width than the diameter of said ball-head and at least equal to the thickness of said neck of said fitting, and lubricant pressure operative means for securing the ball-head of a fitting within said socket.

10. A coupler and lubricant nozzle for a ball-head lubrication fitting having a neck and lubricant receiving duct through the head and neck comprising a sleeve having one end formed to provide an internal socket thereat for the reception of the ball-head of a fitting throughout a wide angular range, said sleeve having an opening through a side wall into said socket for the passage of the ball-head therethrough into the socket, said sleeve end having a slot extending partially thereacross transversely thereof and communicating with said socket and opening, said slot being of less width than the diameter of said ball-head and at least equal to the thickness of said neck of said fitting, and means slidably mounted in said sleeve for automatically but releasably securing the ball-head of a fitting in said socket and making a lubricant-tight seal with said ball-head.

11. A coupler and lubricant nozzle for a ball-head lubrication fitting having a neck and lubricant receiving duct through the head and neck comprising a sleeve having one end formed to provide an internal socket thereat for the reception of the ball-head of a fitting throughout a wide angular range, said sleeve having an opening through a side wall into said socket for passage of the ball head therethrough into the socket, and lubricant pressure operative means for securing the ball-head of a fitting within said socket.

12. A coupler for servicing a ball-head lubrication fitting comprising a sleeve having a ball receiving socket adjacent to one end and having an opening through a side wall adjacent to said end for the reception of the ball-head of said fitting therethrough, a second sleeve mounted within the first said sleeve for sliding movements toward and from said socket, and having its end nearest to said socket formed with a beveled edge whereby the insertion of said fitting into said socket initially cams said last named sleeve away from said socket, and resilient means normally urging said second sleeve toward said socket, whereby said fitting may be snapped into said socket.

13. A coupler for servicing a ball-head lubrication fitting comprising a pair of telescoping and relatively slidable sleeves, one of said sleeves being formed with a ball receiving socket for the reception of the ball-head of said lubrication fitting, and means normally urging the other said sleeve to cooperate with said fitting to secure the ball-head of the fitting in said socket, one of said sleeves being formed with a beveled edge portion whereby the insertion of said ball-head into said socket initially cams one said sleeve relatively to the other.

In witness whereof, I have affixed my signature.

THEODORE E. HERLIHY.